(12) United States Patent
Butts

(10) Patent No.: US 8,916,216 B2
(45) Date of Patent: Dec. 23, 2014

(54) DECORATIVE APPARATUS TO HOLD CANDY

(71) Applicant: Barbara Butts, Norco, CA (US)

(72) Inventor: Barbara Butts, Norco, CA (US)

(*) Notice: Subject to any disclaimer, the term of this patent is extended or adjusted under 35 U.S.C. 154(b) by 0 days.

(21) Appl. No.: 13/662,548

(22) Filed: Oct. 29, 2012

(65) Prior Publication Data
US 2013/0168343 A1 Jul. 4, 2013

Related U.S. Application Data

(62) Division of application No. 12/641,186, filed on Dec. 17, 2009, now Pat. No. 8,298,598.

(51) Int. Cl.
*A23G 3/56* (2006.01)

(52) U.S. Cl.
USPC .......... 426/104; 426/134; 211/85.4; 211/123; 211/124; 206/457; 428/24; 428/34.1

(58) Field of Classification Search
USPC .............. 426/104, 134; 211/85.4, 41.2, 41.7, 211/123, 124; 224/191; 206/457; 428/24, 428/34.1
See application file for complete search history.

(56) References Cited

U.S. PATENT DOCUMENTS

| | | | | |
|---|---|---|---|---|
| 982,461 | A * | 1/1911 | Becker | 426/104 |
| 1,238,110 | A * | 8/1917 | Coolidge | 426/104 |
| 1,382,383 | A * | 6/1921 | Porter | 426/104 |
| 1,468,743 | A * | 9/1923 | Porter | 206/423 |
| 1,544,120 | A * | 6/1925 | Zickos et al. | 118/500 |
| 1,545,463 | A * | 7/1925 | Dreyer | 426/104 |
| 1,569,747 | A * | 1/1926 | Haug | 426/104 |
| 1,589,911 | A * | 6/1926 | Waters | 426/104 |
| 3,332,787 | A * | 7/1967 | Wagenheim | 426/104 |
| 5,740,912 | A * | 4/1998 | Chen | 206/457 |

FOREIGN PATENT DOCUMENTS

JP 2-9344 * 1/1990 ............ A23G 1/00

* cited by examiner

*Primary Examiner* — Rena Dye
*Assistant Examiner* — Chaim Smith
(74) *Attorney, Agent, or Firm* — Muskin & Farmer LLC

(57) ABSTRACT

An apparatus used to arrange and display decorative items or candy. A narrow stem comprises a plurality of holes running throughout the stem. A plurality of metal rods are inserted into respective holes in the stem. Each metal rod has is attached to a plastic petal, which also comprises a clip. A piece of candy can be attached to each clip and can be supported by each respective petal. The plurality of metal rods arranged in this manner create a visually appealing arrangement of decorative items or dispenser of candy.

3 Claims, 19 Drawing Sheets

DECORATIVE APPARATUS TO HOLD CANDY

CROSS REFERENCE TO RELATED APPLICATIONS

This Application is a Divisional Application of U.S. application Ser. No. 12/641,186, now allowed, entitled, "Decorative Apparatus to Hold Candy", filed in the USPTO on Dec. 17, 2009, which is incorporated by reference herein in its entirety.

BACKGROUND OF THE INVENTION

1. Field of the Invention

The present general inventive concept is directed to an apparatus for arranging candy or small decorative items in an aesthetically pleasing arrangement.

2. Description of the Related Art

Candy arrangements are well known in the art and are sent as gifts.

However, what is needed is an apparatus that can arrange candy in an aesthetically pleasing manner which can also allow for easy removal of individual candy pieces by the owner.

SUMMARY OF THE INVENTION

It is an aspect of the present invention to

The above aspects can be obtained by an apparatus that includes (a) a stem comprising a plurality of holes; (b) an extension comprising: a metal rod comprising a first end inserted inside a hole inside the stem and a second end extruding outside of the stem; and (c) a petal connected to the second end of the metal rod, the petal comprising a clip.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
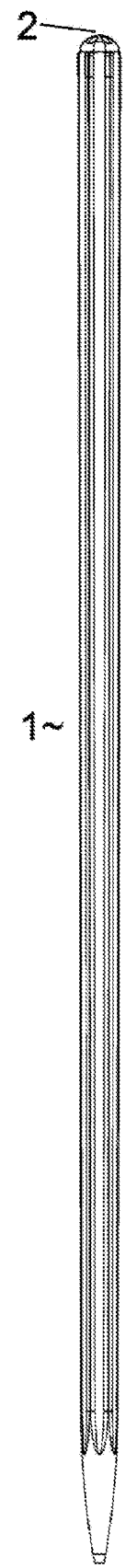
FIG. 1 is a front view of a stem, according to an embodiment.

Reference will now be made in detail to the presently preferred embodiments of the invention, examples of which are illustrated in the accompanying drawings, wherein like reference numerals refer to like elements throughout.

The present inventive concept relates to an apparatus for displaying and arranging confectionary items such as candy in an ornamental arrangement, such as in the shape of a flower. The arrangement can be suitable for placing in a vase, either a single arrangement or multiple arrangements and ideal for giving as gifts.

The arrangement comprises a narrow stem adapted for inserting a number of metal rods into, such as five (although other numbers can be used as well, such as from 1-10). Each metal rod can have at an opposite end from the stem a plastic (or made from any other material) petal, which can be used to attach (or seat) a piece of candy onto. All of the petals which are attached to their respective rods can be arranged in a circular (or other) shape in order to create an aesthetically pleasing display of the arranged candy. The candy can be easily removed from the arrangement so that it can be eaten by the owner if the owner so desires. See FIG. 13 for one example of an arrangement according to an embodiment.

FIG. 1 is a front view of a stem, according to an embodiment.

A stem 1 can be any length, for example, 12 inches, although the actual length is not important. A stem top 2 is located at a top of the stem 1. The stem can be any color, although it may be preferable to have the stem colored green in order to be associated with a plant or flower stem.

Figure 2:
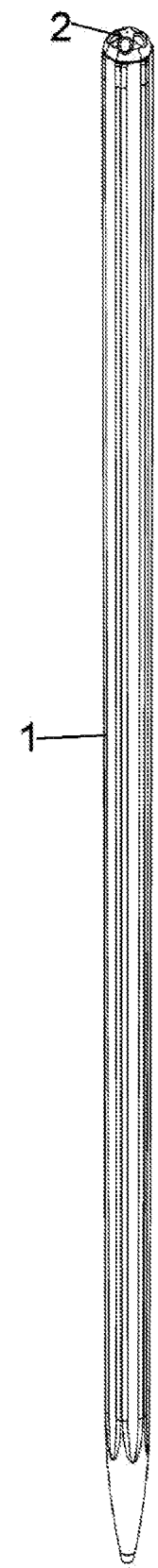
FIG. 2 is an orthographic view of a stem, according to an embodiment.

FIG. 2 is an orthographic view of a stem, according to an embodiment.

Figure 3:
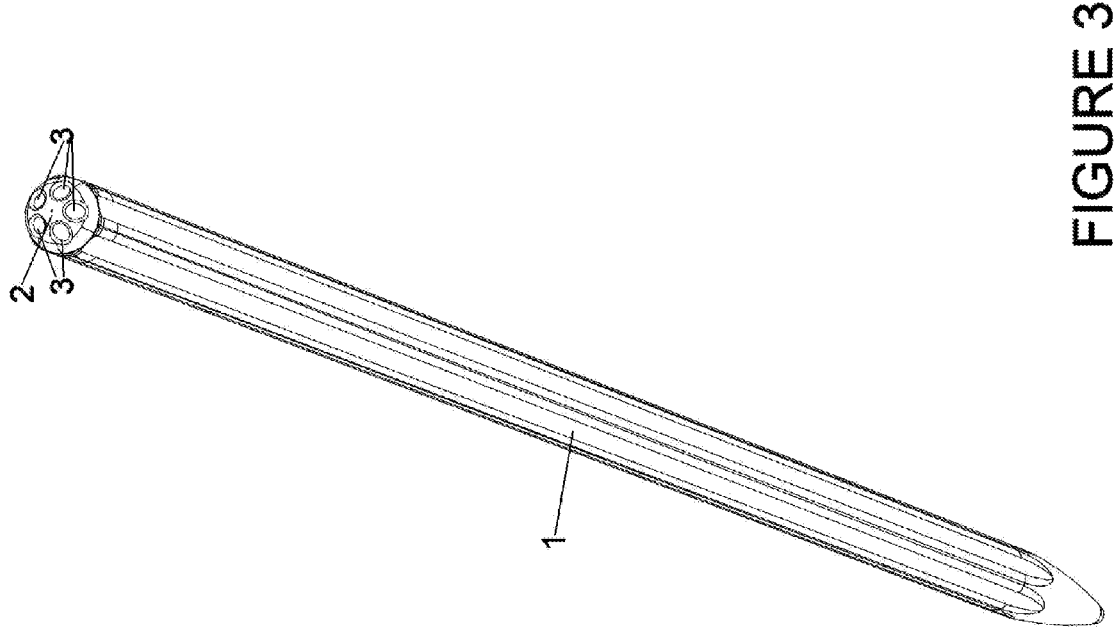
FIG. 3 is a further orthographic view of a stem, according to an embodiment.

FIG. 3 is a further orthographic view of a stem, according to an embodiment.

The stem top 2 of the stem 1 comprises five holes 3, although any number of holes can be used (e.g., 1-10). The holes run inside the stem 1 in order that a narrow metal rod can be inserted inside each hole. Each hole can run inside the stem 1 halfway throughout the length of the stem 1, or any other length, so that a metal rod (not pictured in FIG. 3) can have a secure placement inside the stem 1.

Figure 4:
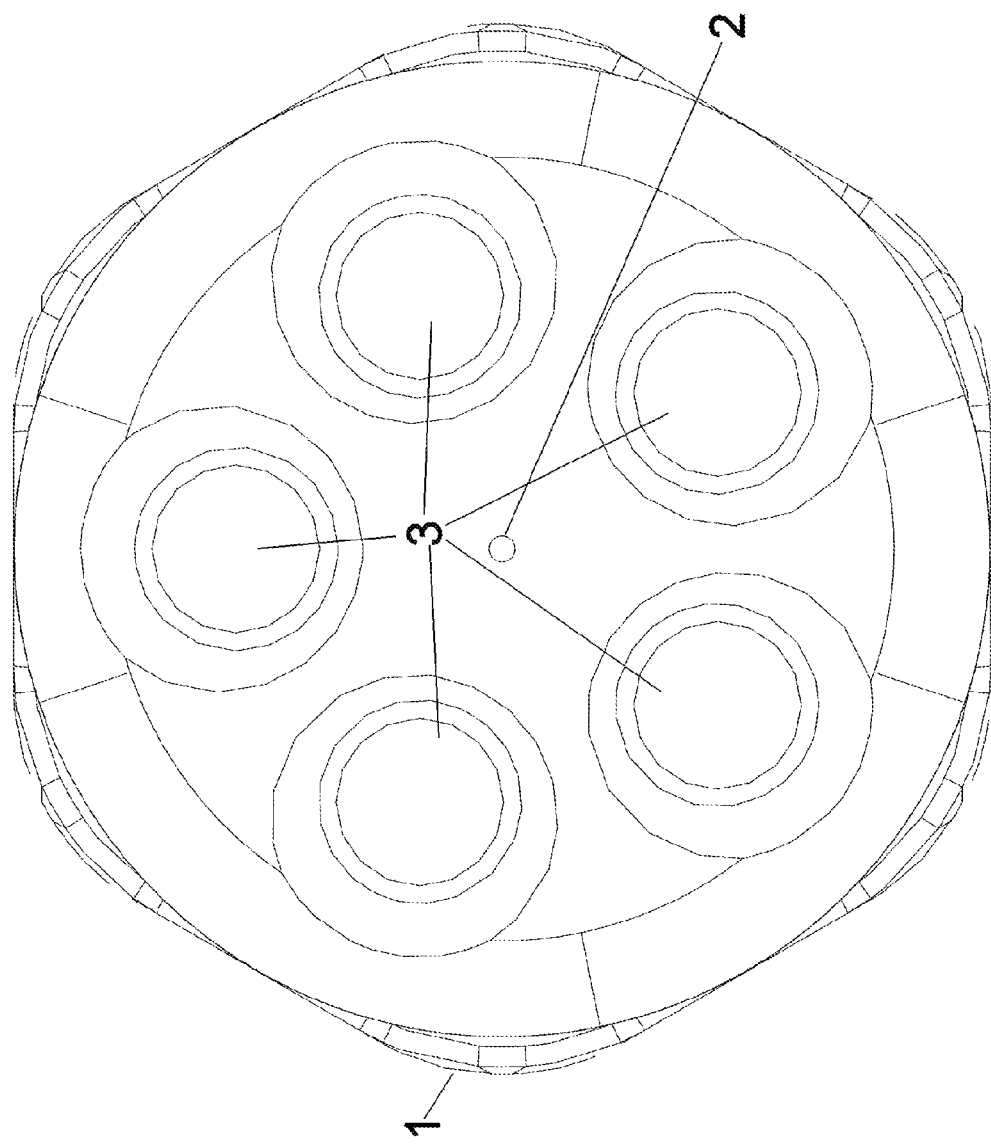
FIG. 4 is a top view of a stem, according to an embodiment.

FIG. 4 is a top view of a stem, according to an embodiment.

The top 2 of the stem 1 comprises five holes 3, although any other number of holes can be used.

Figure 5:
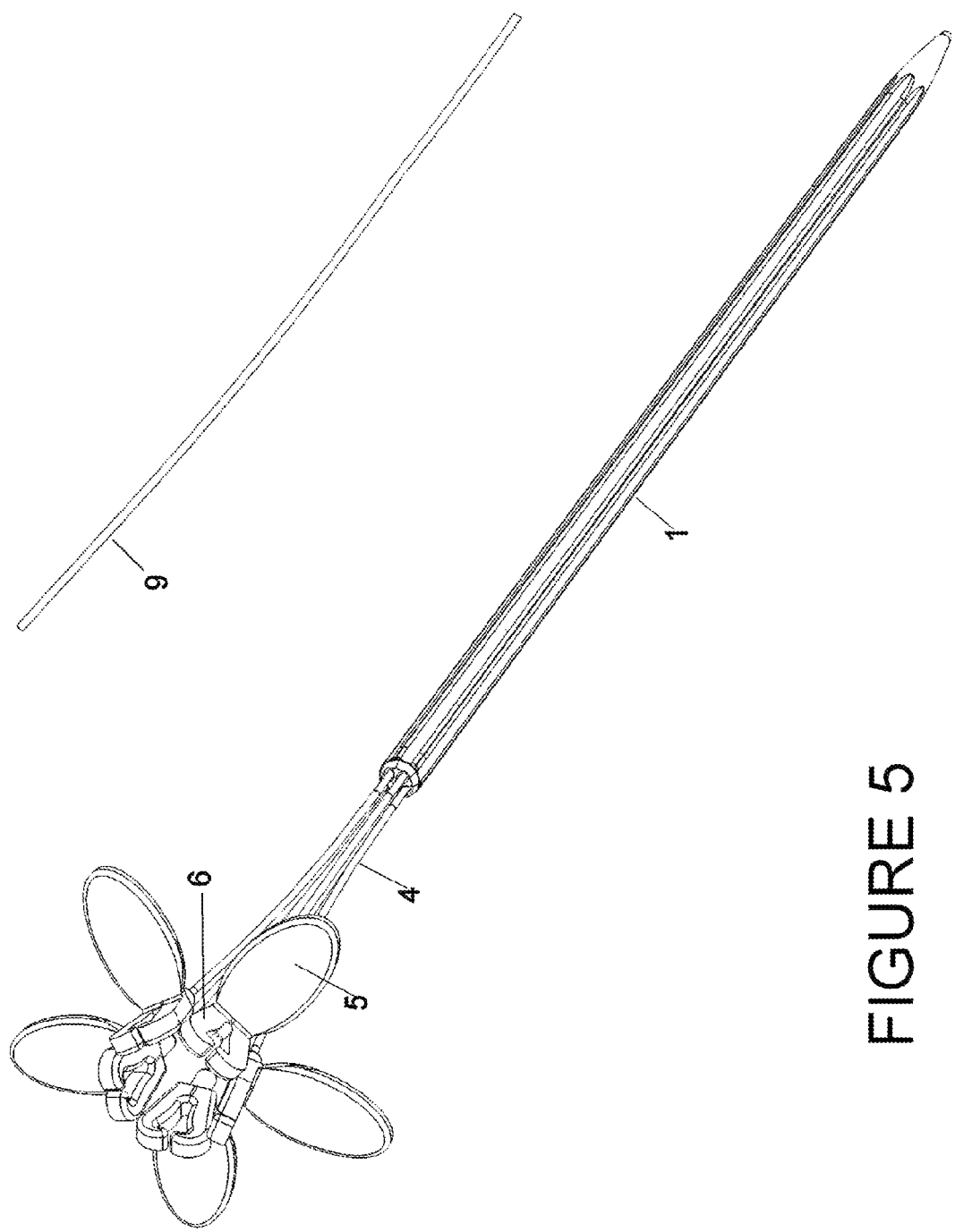
FIG. 5 is an orthographic view of a stem with wires and petals, according to an embodiment.

FIG. 5 is an orthographic view of a stem with wires and petals, according to an embodiment.

A stem 1 has inserted into it a plurality of metal rods. An isolated metal rod 9 is shown to illustrate a relative length of a metal rod 9 to the stem 1. An inserted metal rod 4 is inserted into the stem 1. A top end of the inserted metal rod 4 is connected to a petal 5 which has connected to it a clip 6. The clip 6 can be any type of clip, such as a spring clip, friction slip, etc. It is noted that the petals can be of any shape.

The stem 1 has five such metal rods inserted into the stem which forms the arrangement as illustrated.

Figure 6:
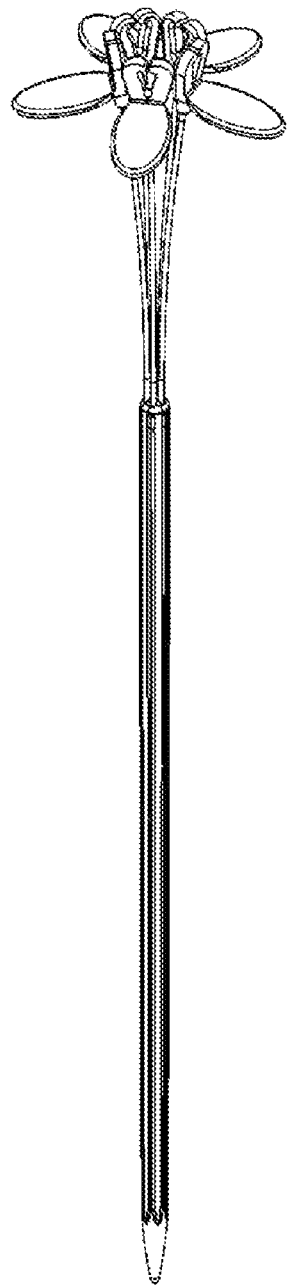
FIG. 6 is an orthographic view from the front of a stem with wires and petals, according to an embodiment.

FIG. 6 is an orthographic view from the front of a stem with wires and petals, according to an embodiment.

Figure 7:
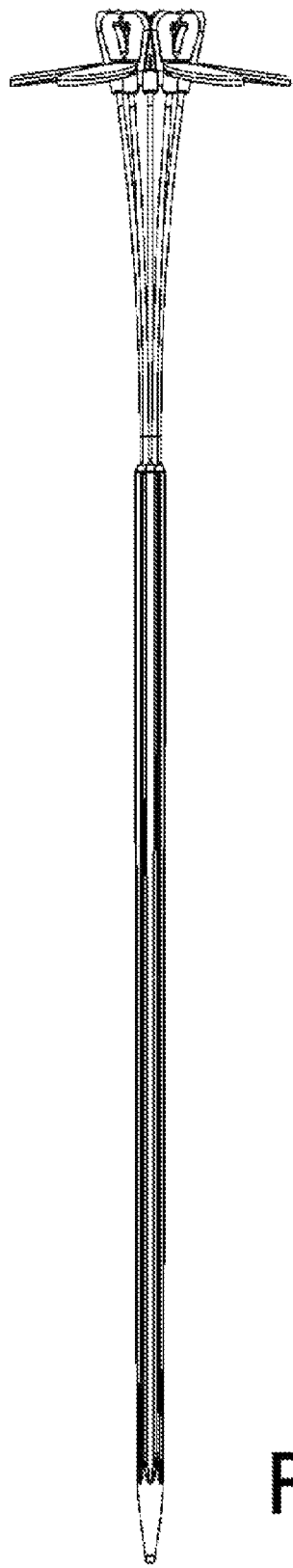
FIG. 7 is a front view of a stem with wires and petals, according to an embodiment.

FIG. 7 is a front view of a stem with wires and petals, according to an embodiment.

Figure 8:
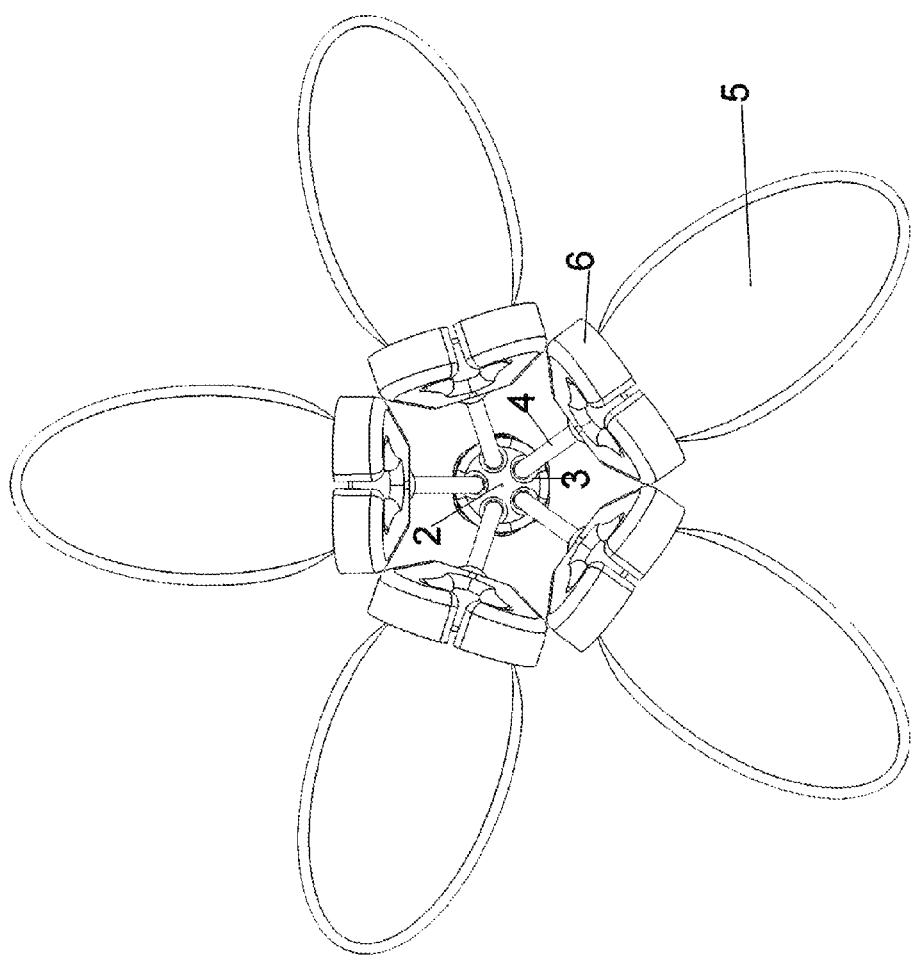
FIG. 8 is a top view of petals, according to an embodiment.

FIG. 8 is a top view of petals, according to an embodiment.

The top 2 of the stem has five metal rods coming out of the holes in the top 2 of the stem. The metal rods can be malleable and thus can be bent with human hands and easily shaped as needed. An inserted metal rod 4 extrudes from its respective hole 3 in the top 2 of the stem. A top end of the metal rod 4 is connected to a petal 5 which is connected to a clip 6. The clips are used to attach it to an individual piece of candy.

Figure 9:
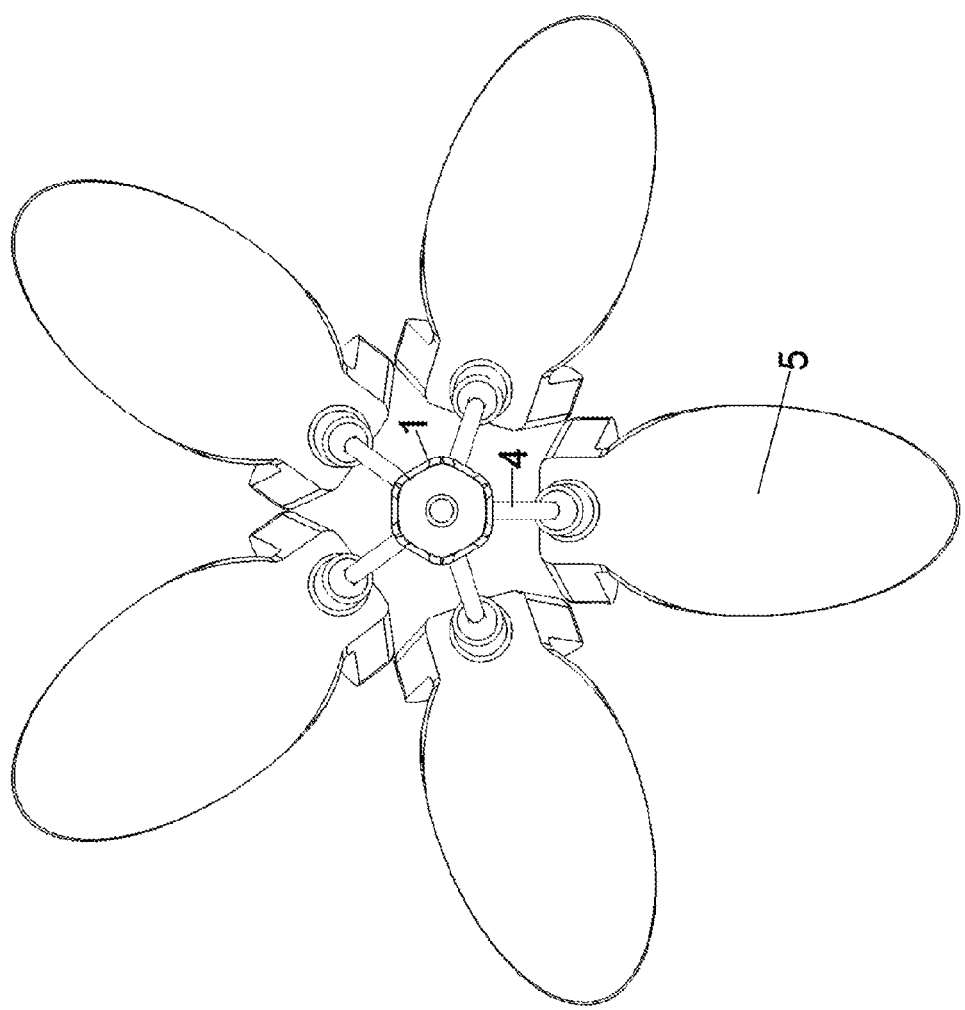
FIG. 9 is a bottom view of petals, according to an embodiment.

FIG. 9 is a bottom view of petals, according to an embodiment.

Visible from the bottom view is the stem 1 and the metal rods, such as inserted metal rod 4, extruding from the stem and connected to petal 5. While not numbered individually for simplicity, each metal rod is connected to its respective petal.

Figure 10:
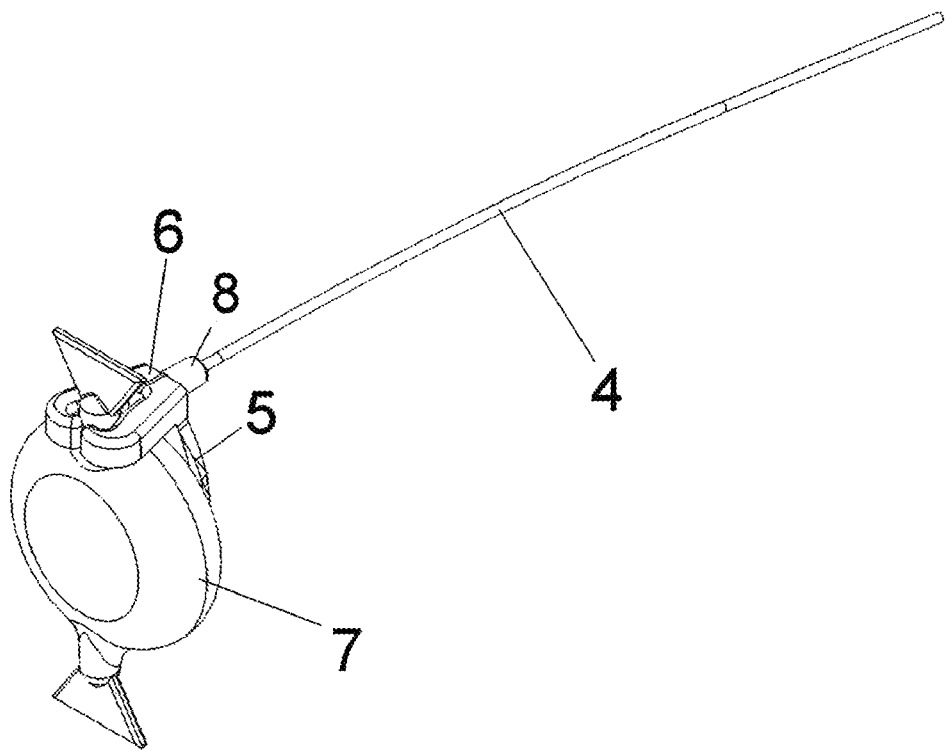
FIG. 10 is an orthographic view of a piece of candy attached to a petal, according to an embodiment.

FIG. 10 is an orthographic view of a piece of candy attached to a petal, according to an embodiment.

An end of the metal rod 4 is inserted into a tube 8 which is adapted to connect to the metal rod 4. The tube 8 can be plastic molded directly around the metal rod 4 so that they are integrally connected. Alternatively, the tube 8 can simply be a hollow portion which the end of the metal rod 4 can be inserted inside of and will remain due to a friction fit. The tube 8 is integrally connected to the petal 5 and the clip 6. An individual piece of candy 7 is attached onto the clip 6 in the manner illustrated. The petal 5 can provide support for the piece of candy 7, as gravity would help the candy 7 fall onto the petal 5.

Figure 13:
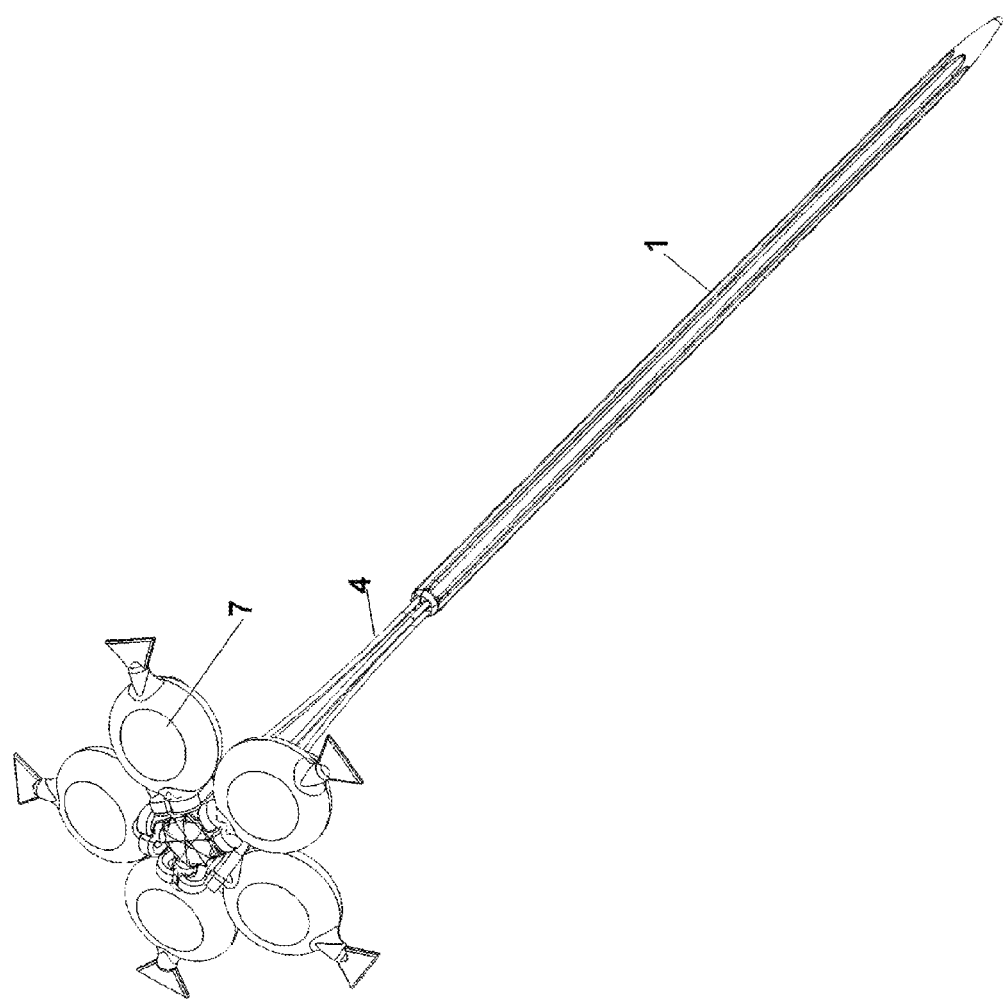
FIG. 13 is an orthographic view of an assembled unit of wires, stems, and petals attached to candy, according to an embodiment.

The combination of the metal rod, tube, petal, and clip can be considered to be an "extension." FIG. 13 illustrates five such extensions connected to respective pieces of candy. In addition to five, other numbers of extensions can be used as well.

Figure 11:
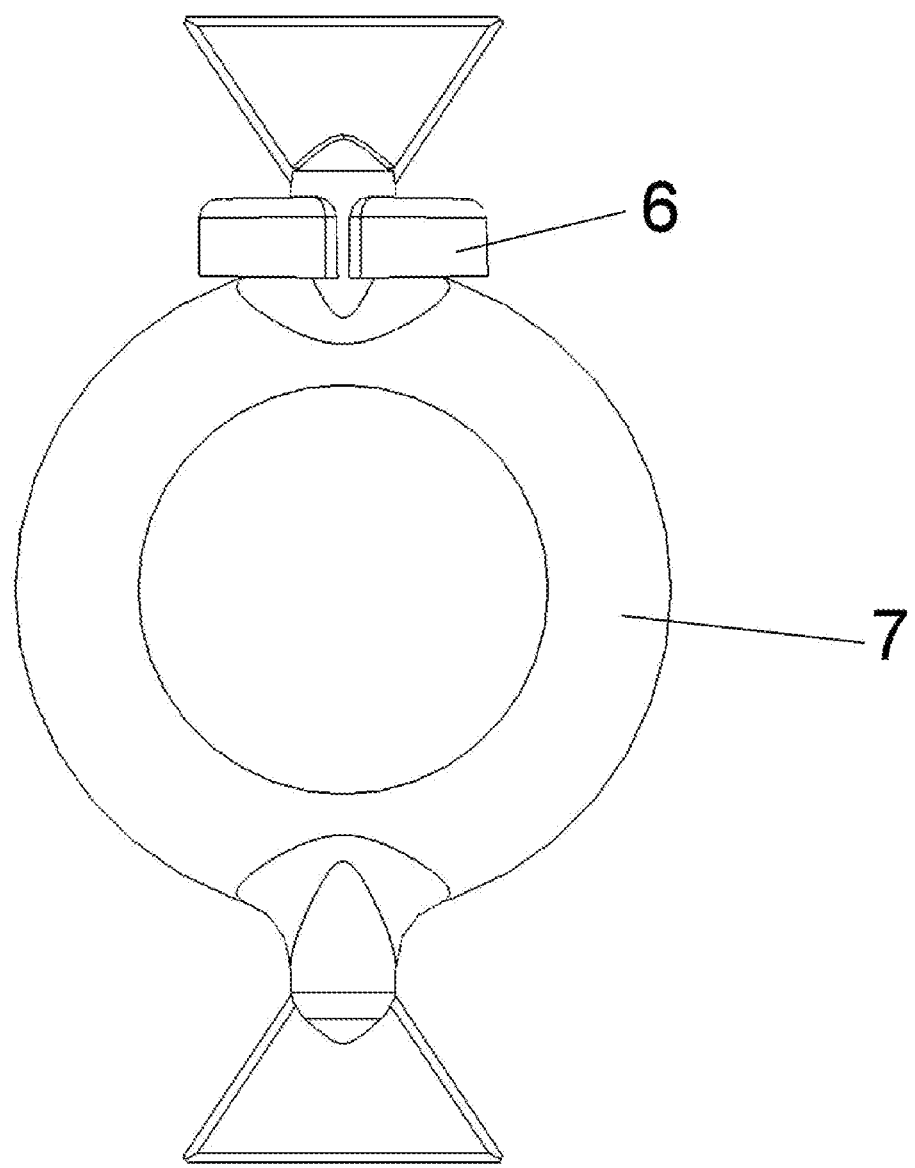
FIG. 11 is a top view of a piece of candy attached to a petal, according to an embodiment.

FIG. 11 is a top view of a piece of candy attached to a petal, according to an embodiment.

A portion of a wrapper of the candy 7 is inserted inside the clip 6, thereby securing the candy 7. The petal can also be considered a "seat" for the candy or other ornamental object.

Figure 12:
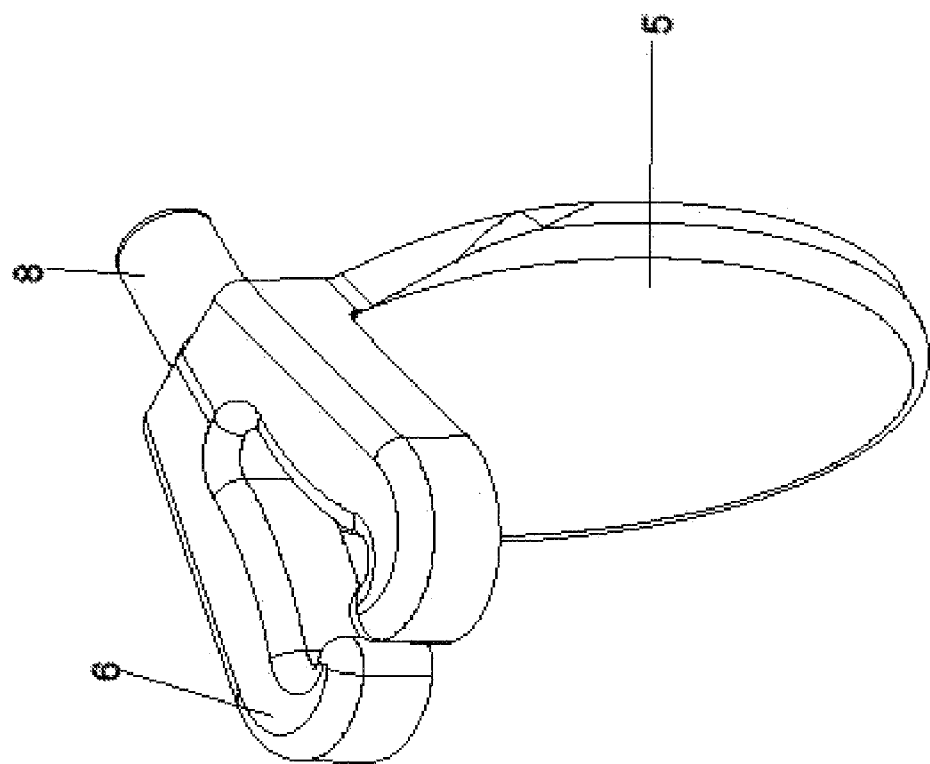
FIG. 12 is a close up orthographic view of a single petal, according to an embodiment.

FIG. 12 is a close up orthographic view of a single petal, according to an embodiment.

The tube 8 can be a hollow piece of circular plastic that a narrow metal rod can fit inside of. The tube 8 is attached to clip 6 and petal 5.

FIG. 13 is an orthographic view of an assembled unit of wires, stems, and petals attached to candy, according to an embodiment.

The stem 1 has inserted metal rod 4 inserted partially inside of the stem 1. The metal rod 4 also partially extends beyond the stem 1 and is attached to a tube (not pictured) which is connected to a petal (not pictured) and clip which attaches to the candy 7. For simplicity, only one out of the five rods and pieces of candy is numbered, but all five rods and associated structure are formed in the same manner.

Figure 14:
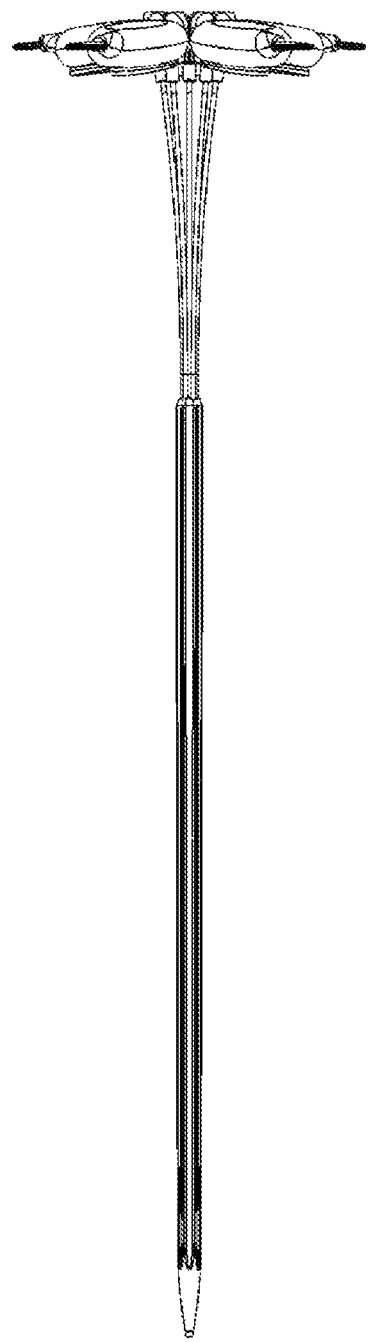
FIG. 14 is a front view of an assembled unit of wires, stems, and petals attached to candy, according to an embodiment.

FIG. 14 is a front view of an assembled unit of wires, stems, and petals attached to candy, according to an embodiment.

Multiple arrangements such as that illustrated in FIG. 14 can be combined together and placed in a vase, to create an aesthetically pleasing arrangement for show (e.g., the candy is not eaten) or to easily dispense candy.

In a further embodiment, a candy flower can comprise wire stems without a plastic common stem.

Figure 15:
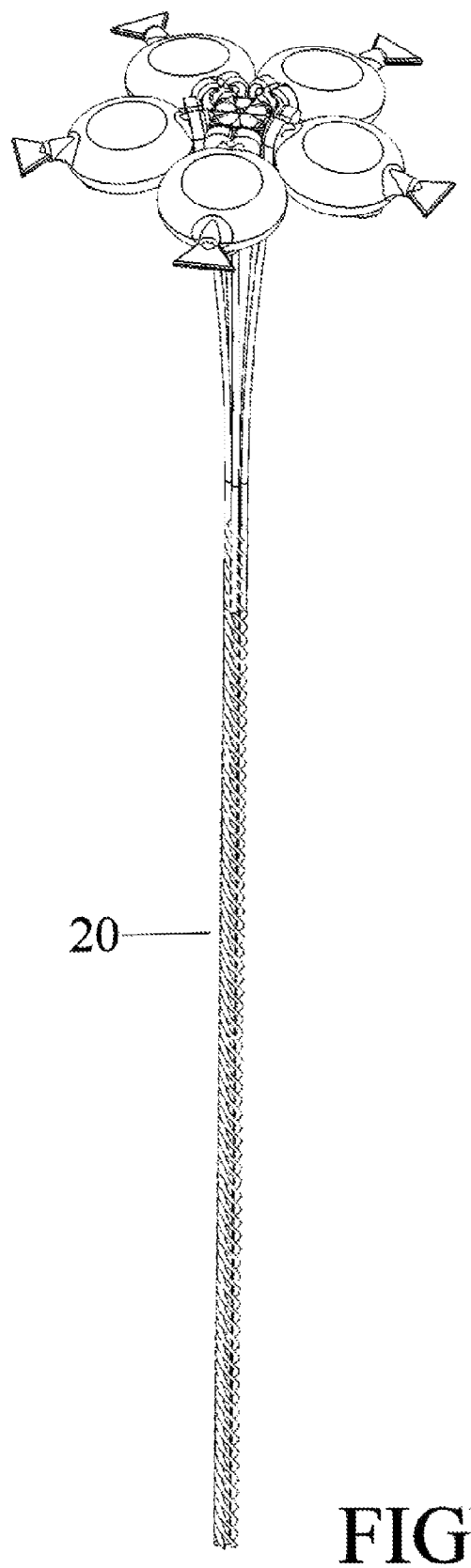
FIG. 15 is a front view of an assembled flower using twisted wires, according to an embodiment.

FIG. 15 is a front view of an assembled flower using twisted wires, according to an embodiment. The wire stems 20 for each petal are all twisted around each other instead of being inserted into a common plastic stem.

Figure 16:
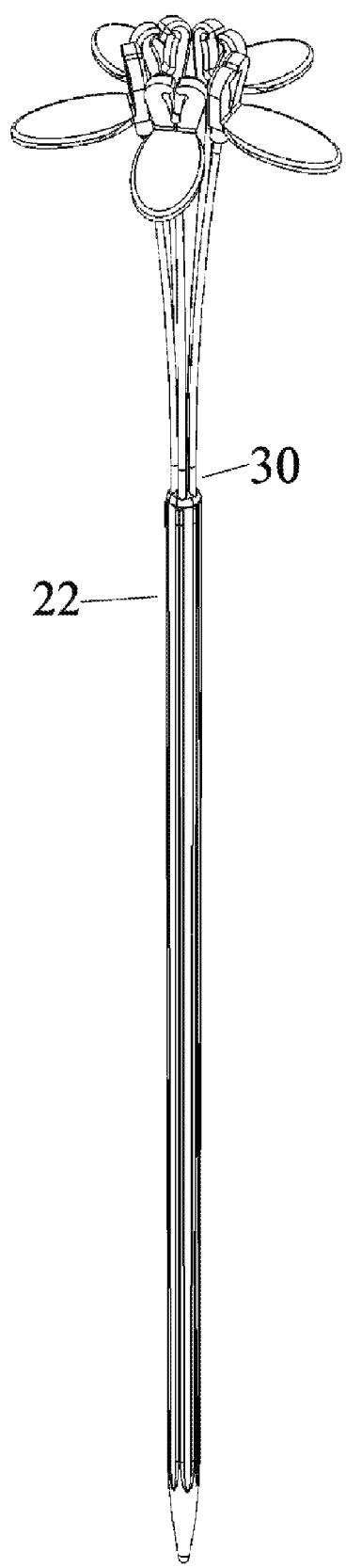
FIG. 16 is front view of an assembled flower using wires embedded into a plastic stem, according to an embodiment.

FIG. 16 is front view of an assembled flower using wires embedded into a plastic stem, according to an embodiment. The wire stems 30 can be co-molded with the plastic stem 22 so that there is no separate plastic common stem with holes in it, as in the embodiment illustrated in FIG. 5.

Figure 17:
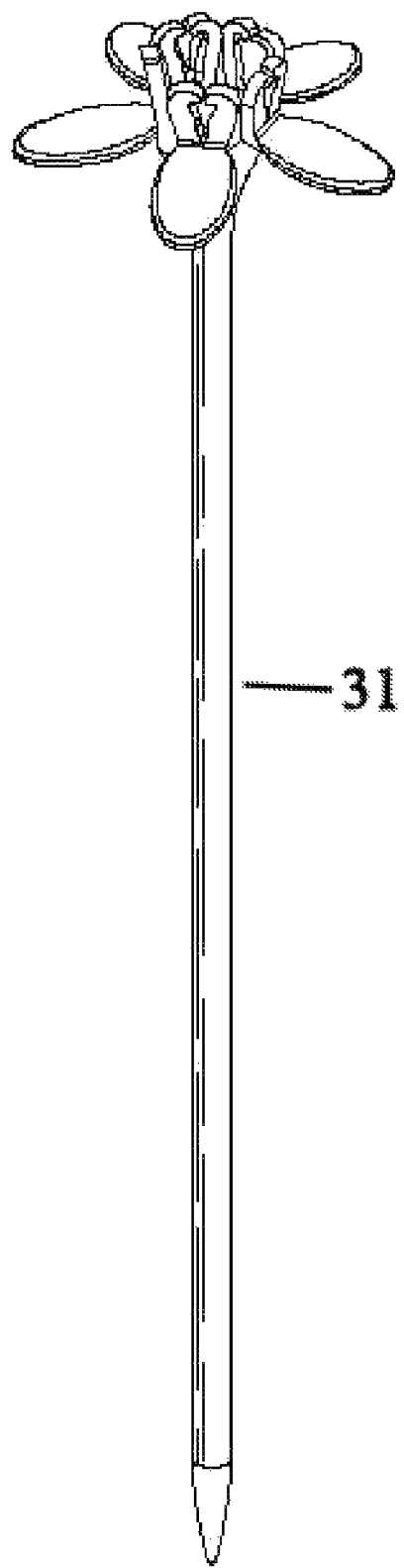
FIG. 17 is a front view of a plastic flower molded in one entire piece, according to an embodiment.

FIG. 17 is a front view of a plastic flower molded in one entire piece, according to an embodiment. In this embodiment, a single plastic piece 31 comprises the stem, petals, clips which can all be molded into one piece. The candy clips may look like the candy clip shown in FIG. 12 of the current patent application, or they may be any kind of spring clip that can hold a piece of candy. The candy clips may be connected to each other instead of being directly connected to the plastic stem.

Figure 18:
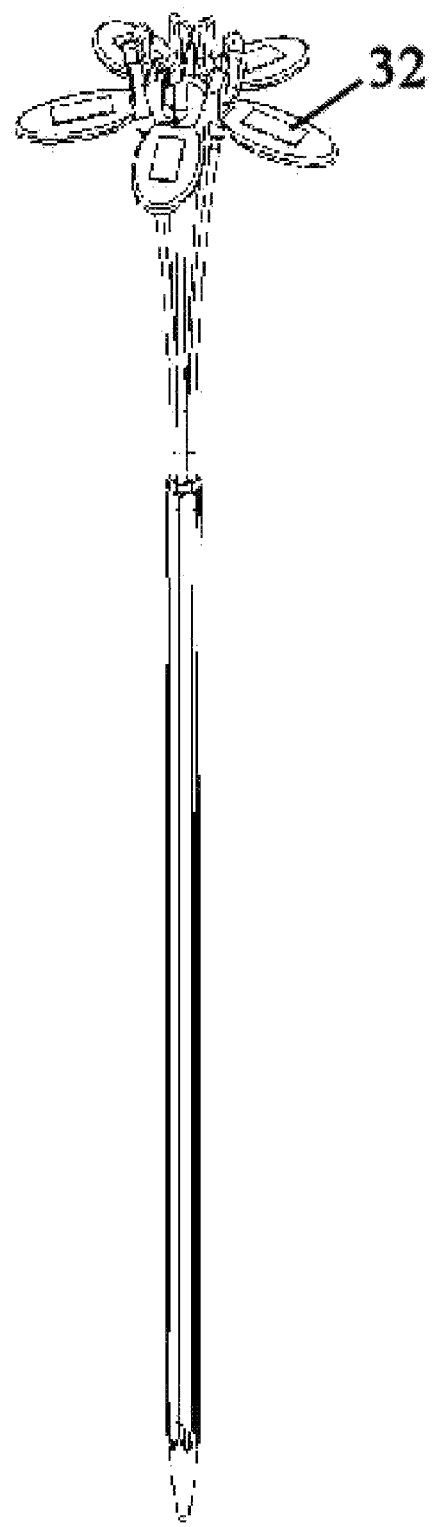
FIG. 18 is a front view of an assembled flower using adhesive strips on petals, according to an embodiment.

FIG. 18 is a front view of an assembled flower using adhesive strips on petals, according to an embodiment. This embodiment can take on the form of any of the other embodiments described herein, but in addition to clips (or in the alternative to clips), adhesive strips 32 can be placed on the petals in order to help attach a piece of candy onto each petal. The adhesive may be peel and stick adhesive, or low tack adhesive, or some other type of adhesive that is attached to each petal of the candy flower, and can be activated prior to assembly with the candy.

Figure 19:
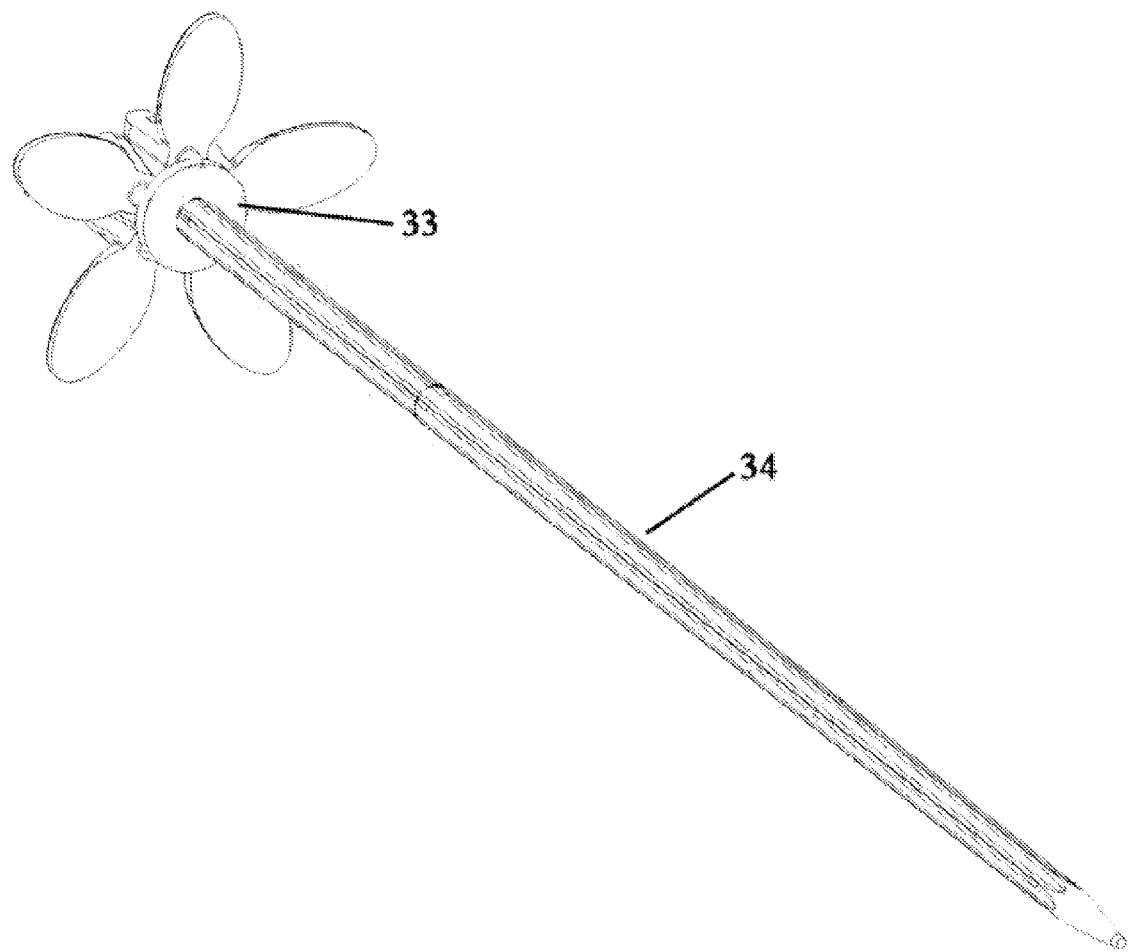
FIG. 19 is a front view of an assembled flower made from two attaching pieces, according to an embodiment.

FIG. 19 is a front view of an assembled flower made from two attaching pieces, according to an embodiment. A stem 34 can be attached to a petal unit 33, by insertion using a friction fit, glue, or any other attaching mechanism. Both the stem 34 and the petal unit 33 can be made of plastic or other suitable material. Thus, in this embodiment, there are simply two pieces that can attach together to form an assembled flower. The stem 34 can be inserted into a hole located in a base of the petal unit 33, the hole adapted to receive the stem 34.

It is noted that the embodiments illustrated in FIGS. 15-19 can incorporate any of the features and structure described herein with respect to any of the other embodiments. Also, it is noted that all parts to the invention (e.g., petal unit, elongated stem, etc.) can be molded as a single piece or molded in different pieces and attached together.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
   at least four wires; each of said wires comprising a seat connected to one end of each of said wires; each of said seats further comprising a clip wherein said clip is connected to said seat; said seat and said clip forming a respective petal on an end of each wire;

wherein said clip is configured to hold a piece of candy; wherein the wires are connected together; and a piece of candy is attached to each clip.

2. The apparatus as recited in claim 1, wherein the clip is a spring clip.

3. The apparatus as recited in claim 1, wherein the wires are twisted together.

* * * * *